US009008049B2

(12) United States Patent
Tian et al.

(10) Patent No.: US 9,008,049 B2
(45) Date of Patent: Apr. 14, 2015

(54) FORWARD LINK FRAME GENERATION IN A MACHINE-TO-MACHINE (M2M) WIRELESS WIDE AREA NETWORK (WAN)

(75) Inventors: Bin Tian, San Diego, CA (US); Alok K. Gupta, San Diego, CA (US); Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/609,727

(22) Filed: Sep. 11, 2012

(65) Prior Publication Data

US 2014/0071953 A1 Mar. 13, 2014

(51) Int. Cl.
*H04J 3/16* (2006.01)
*H04W 4/00* (2009.01)
*H04W 72/04* (2009.01)
*H04W 52/02* (2009.01)
*H04W 28/02* (2009.01)

(52) U.S. Cl.
CPC ............ *H04J 3/1694* (2013.01); *H04W 4/005* (2013.01); *H04W 72/0406* (2013.01); *H04W 52/0216* (2013.01); *H04W 52/0219* (2013.01); *H04W 72/0446* (2013.01); *H04W 28/0215* (2013.01)

(58) Field of Classification Search
CPC ..... H04J 3/1694; H04W 72/04; H04W 4/005; H04W 52/0216; H04W 52/0219; H04W 72/042; H04W 72/0446; H04W 28/0215
USPC .......................... 370/366, 310–350, 431–463
See application file for complete search history.

(56) References Cited

U.S. PATENT DOCUMENTS

| | | | | |
|---|---|---|---|---|
| 4,754,453 | A * | 6/1988 | Eizenhofer | 370/337 |
| 5,392,287 | A | 2/1995 | Tiedemann, Jr. et al. | |
| 5,640,395 | A * | 6/1997 | Hamalainen et al. | 370/322 |
| 6,389,000 | B1 * | 5/2002 | Jou | 370/342 |
| 6,535,502 | B1 | 3/2003 | Brink | |
| 7,324,496 | B1 * | 1/2008 | Sooch et al. | 370/345 |
| 7,333,797 | B2 | 2/2008 | Thorson | |

(Continued)

FOREIGN PATENT DOCUMENTS

DE 102012200116 A1 8/2012
WO WO 2011099753 A2 * 8/2011

OTHER PUBLICATIONS

"Physical Layer Standard for cdma2000 Spread Spectrum Systems Version 2.0," 3rd Generation Partnership Project 2, Sep. 2005.*

(Continued)

*Primary Examiner* — Thai Hoang
*Assistant Examiner* — Kenneth P Hunt
(74) *Attorney, Agent, or Firm* — Jeffrey D. Jacobs

(57) ABSTRACT

Methods, systems, and devices are described for managing wireless communications in a machine-to-machine (M2M) wireless Wide Area Network (WAN). A physical layer frame is generated. The frame being used for wireless M2M communications on a forward link in the M2M wireless WAN. The frame including no more than three channels. The physical layer frame including a first channel including paging channel, a second channel including a traffic channel, and a third channel including an acknowledgment (ACK) channel. A time division multiplexing (TDM) operation is performed on pilot symbols and data symbols to obtain a TDM pilot burst. At least one TDM pilot burst is inserted into each channel of the physical layer frame. The physical layer frame is transmitted on the forward link at a low data rate.

32 Claims, 13 Drawing Sheets

(56) References Cited

U.S. PATENT DOCUMENTS

| | | | |
|---|---|---|---|
| 7,433,331 | B2 | 10/2008 | Welnick et al. |
| 8,107,565 | B2 | 1/2012 | Li et al. |
| 8,238,931 | B1* | 8/2012 | Sarkar et al. ............... 455/453 |
| 2004/0235472 | A1 | 11/2004 | Fujishima et al. |
| 2005/0202791 | A1* | 9/2005 | Krause ............... 455/127.4 |
| 2006/0203932 | A1 | 9/2006 | Palanki et al. |
| 2009/0019165 | A1* | 1/2009 | Li et al. ............... 709/227 |
| 2010/0189188 | A1* | 7/2010 | Li et al. ............... 375/260 |
| 2011/0319120 | A1 | 12/2011 | Chen et al. |
| 2012/0020304 | A1* | 1/2012 | Hole et al. ............... 370/329 |
| 2012/0063302 | A1 | 3/2012 | Damnjanovic et al. |
| 2012/0100862 | A1* | 4/2012 | Fu ............... 455/450 |

OTHER PUBLICATIONS

3GPP TS 36.300: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11 )," 3rd Generation Partnership Project (3GPP), Mobile Competence Centre ; 650, Route Des Lucioles; F-06921 Sophia-Antipolis Cedex ; France, vol. RAN WG2, No. V11.2.0, Release 11, Jun. 27, 2012, pp. 1-201, XP050581140.

"3rd Generation Partnership Project; Technical Specification Group Radio Access Network; Evolved Universal Terrestrial Radio Access (E-UTRA); Services provided by the physical layer (Release 10)", 3GPP Standard: 3GPP Generation Partnership Project (3GPP), Mobile Competence Centre; 650, Route Des Lucioles; F-06921 Sophia-Antipolis Cedex; France, vol. RAN WG2, No. V10.4.0, Mar. 12, 2012 (Mar. 12, 2012), pp. 1-19, XP050580014, [retrieved on Mar. 12, 2012], chapters 2, 6.2.1, 6.2.3, 8.2.

"3rd Generation Partnership Project; Technical Specification Group Radio Access Network; Study on RAN Improvements for Machine-type Communications; (Release 10)", 3GPP Draft; Text Proposal for TR 37.868 to Conclude the Study on RAN Overload Control, 3rd Generation Partnership Project (3GPP), Mobile Competence Centre ;650, Route Des Lucioles ; F-06921 Sophia-Antipolis Cedex; France, vol. RAN WG2, No. Athens, Greece; 20110822, Aug. 16, 2011, XP050540162, pp. 1-26, [retrieved on Aug. 16, 2011], chapters 5.1.5, 5.1.6.

Bollen R.E., et al., "A next-generation tactical system architecture for tetherless communicators", Military Communications Conference, 1993. Milcom '93. Conference Record. Communications on the Move., IEEE Boston, MA, USA Oct. 11-14, 1993, New York, NY, USA, IEEE, US, vol. 3, Oct. 11, 1993, pp. 998-1002, XP010142789, DOI: 10.1109/MILCOM.1993.408671 ISBN: 978-0-7803-0953-1, Introduction—p. 999, right-hand column, paragraph 4 p. 1000, left-hand column. paragraph 3 p. 1001, left-hand column. paragraph 3.

International Search Report and Written Opinion—PCT/US2013/059002-ISA/EPO-Mar. 18, 2014

Nokia Siemens Networks: "Hybrid MTC Channel", 3GPP Draft; GP-110230_HYBRID_MTC_CHANNEL, 3rd Generation Partnership Project (3GPP), Mobile Competence Centre; 650, Route Des Lucioles; F-06921 Sophia-Antipolis Cedex; France, vol. TSG GERAN, No. Chengdu; 20110304, Feb. 24, 2011, pp. 1- 8, XP050486507, [retrieved on Feb. 24, 2011], chapters 1, 2.1, 2.5. 3.3.

* cited by examiner

FORWARD LINK FRAME GENERATION IN A MACHINE-TO-MACHINE (M2M) WIRELESS WIDE AREA NETWORK (WAN)

BACKGROUND

The following relates generally to wireless communication, and more specifically to communications in a machine-to-machine (M2M) wireless wide area network (WAN). Wireless communications systems are widely deployed to provide various types of communication content such as voice, video, packet data, messaging, broadcast, sensor data, tracking data, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple devices. In some examples, these devices may be sensors and/or meters configured to collect data about other devices and transmit this data to an end server via a base station. These sensors and/or meters may be referred to as M2M devices. Base stations may communicate with M2M devices on forward and reverse links. Each base station has a coverage range, which may be referred to as the coverage area of the cell. A base station may transmit information using a number of channels within a frame. An M2M device may monitor channels within multiple frames to identify data or messages transmitted from the base station. Because the base station transmits to a number of M2M devices, an M2M device may unnecessarily monitor channels that do not carry data or messages for that particular device. As a result, the M2M device may consume a high level of power monitoring communications transmitted from the base station that do not include data or messages intended for that M2M device.

SUMMARY

The described features generally relate to one or more improved systems, methods, and/or apparatuses for generating forward link frames that are slotted for a number of M2M devices. The structure of the frame may allow an M2M device to wake up and monitor only the time slots of a frame that include data and/or messages intended for that device and then return to a sleep state to conserve power.

A method for wireless communication in a machine-to-machine (M2M) wireless Wide Area Network (WAN) is described. In one configuration, a physical layer frame is generated for wireless M2M communication on a forward link in the M2M wireless WAN. The frame including no more than three channels including a first channel comprising a paging channel, and a second channel comprising a traffic channel.

The frame may further include a third channel comprising an acknowledgment (ACK) channel. The length of the first channel comprising the paging channel and the length of the third channel comprising the ACK channel is 5 milliseconds (ms), and the length of the second channel comprising the traffic channel is 10 ms. In one example, system information and timing information may be transmitted using the first channel comprising the paging channel.

A time slot of the physical layer frame that is assigned to an M2M device may be identified. Data may be transmitted during the identified time slot to the M2M device. A plurality of messages may be received from a plurality of M2M devices. A plurality of acknowledgment (ACK) messages may be generated, and the plurality of ACK messages may be grouped into an ACK packet. The ACK packet comprising the plurality of ACK messages may be transmitted.

In one embodiment, a time division multiplexing (TDM) operation may be performed on one or more pilot symbols and one or more data symbols to obtain one or more TDM pilot bursts. The one or more TDM pilot busts may be inserted in one or more channels of the physical layer frame. Each TDM pilot burst may include a length of 56 chips. A chip may be a pseudo noise (PN) code symbol. Consecutive TDM pilot bursts may be spaced by 256 chips.

The TDM pilot bursts and the data symbols may be scrambled using a first pseudo noise (PN) sequence. The first PN sequence may be offset from a PN sequence used to scramble TDM pilot bursts and data symbols of a frame transmitted from a neighbor base station.

The physical layer frame may be transmitted on the forward link to one or more M2M devices. In one configuration, the physical layer frame may be transmitted at a data rate of 9.6 bits per second. The length of the physical layer frame may be 20 milliseconds (ms).

A base station configured for wireless communication in a machine-to-machine (M2M) wireless Wide Area Network (WAN) is also described. The base station may include a processor and memory in electronic communication with the processor. Instructions may be stored in the memory. The instructions may be executable by the processor to generate a physical layer frame for wireless M2M communication on a forward link in the M2M wireless WAN. The frame may include no more than three channels including a first channel comprising a paging channel, and a second channel comprising a traffic channel.

An apparatus configured for wireless communication in a machine-to-machine (M2M) wireless Wide Area Network (WAN) is also described. The apparatus may include means for generating a physical layer frame for wireless M2M communication on a forward link in the M2M wireless WAN. The frame may include no more than three channels including a first channel comprising a paging channel, and a second channel comprising a traffic channel.

Further, a computer program product for managing wireless communication in a machine-to-machine (M2M) wireless Wide Area Network (WAN) is also described. The computer program product includes a non-transitory computer-readable medium storing instructions executable by a processor to generate a physical layer frame for wireless M2M communication on a forward link in the M2M wireless WAN. The frame may include no more than three channels including a first channel comprising a paging channel, and a second channel comprising a traffic channel.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described to generate forward link frames for communications from a base station to a M2M device in a wireless M2M WAN. The frames may be slotted for different M2M devices to allow the base station to communicate with multiple M2M devices. A single frame may be a repeating data block with no more than three time slots. Each slot of each frame may be for a logical time division multiplexed (TDM) channel that carries data and/or messages for a particular M2M device. The channels within a frame may include a paging channel (during a paging slot), an acknowledgment (ACK) channel (during an ACK slot), and a traffic channel (during a traffic slot). In one example, the base station may generate multiple frames. The frames may be joined to form one larger frame. Data and/or messages for multiple M2M devices may be transmitted in the channels of a frame during certain slots. Currently, M2M devices may unnecessarily consume power by waking up and monitoring the channels of each time slot of each frame for data and/or messages (i.e., waking up for the entire duration of the transmission of the larger frame).

The format of each individual forward link frame of the present systems and methods may allow the M2M device to wake up and only monitor channels in the time slots of the individual frames that carry data and/or messages intended for that device. Once the M2M device has received the message and/or data, it may return to a sleep state. As a result, the format of the forward link frame described herein allows M2M devices to remain in a sleep state until data and/or messages intended for that device are actually being transmitted from the base station. Thus, the structure of the forward link frame described herein includes a minimal number of time slots and channels in order to provide power efficiencies for the M2M devices communicating with the base station in a wireless M2M WAN by allowing the M2M devices to only wake up when a time slot of a frame includes data and/or messages for the devices.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
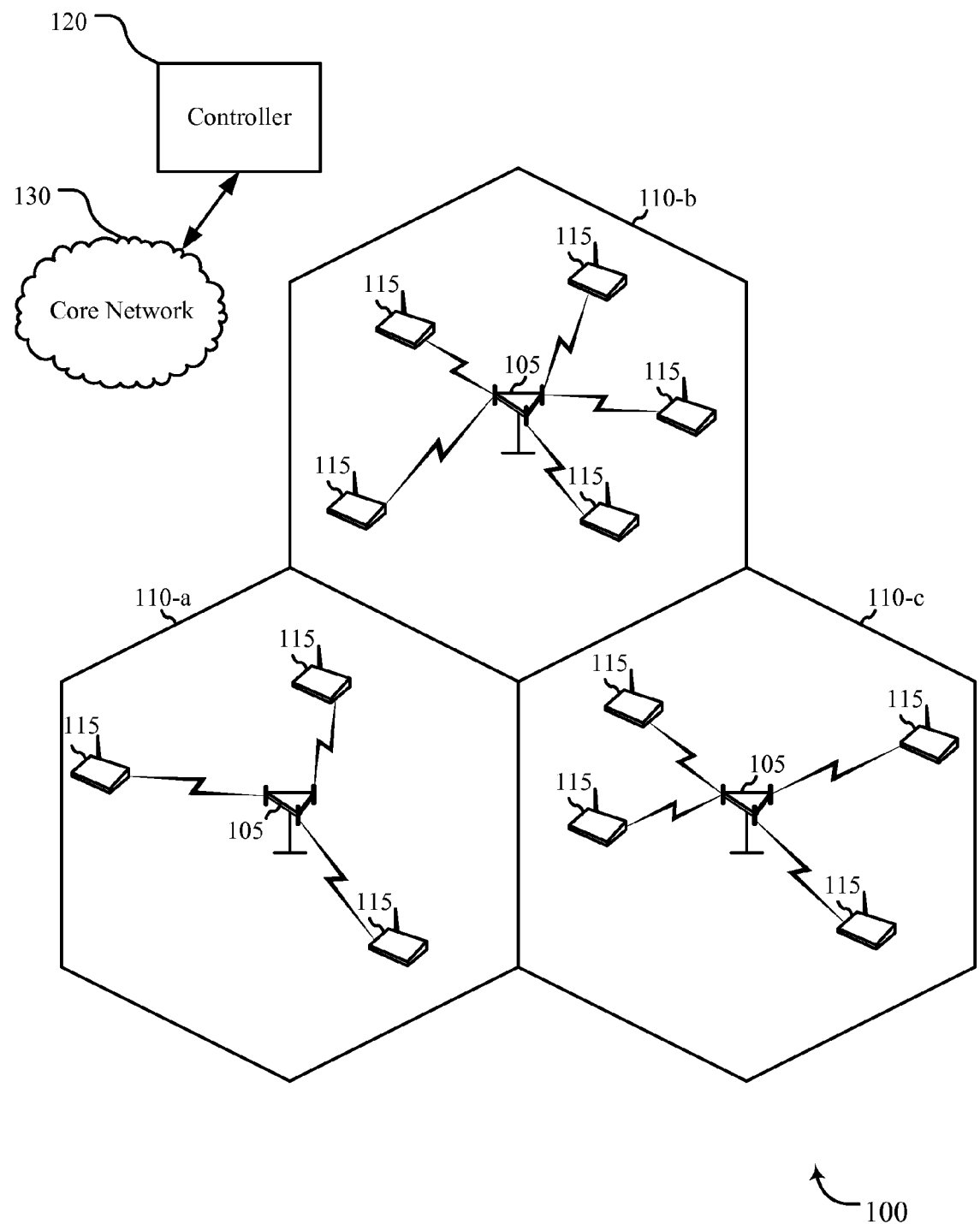
FIG. 1 shows a block diagram of a wireless communications system.

Referring first to FIG. 1, a block diagram illustrates an example of a wireless communications system 100. The system 100 includes base stations 105 (or cells), machine-to-machine (M2M) devices 115, a base station controller 120, and a core network 130 (the controller 120 may be integrated into the core network 130). The system 100 may support operation on multiple carriers (waveform signals of different frequencies).

The base stations 105 may wirelessly communicate with the M2M devices 115 via a base station antenna (not shown). The base stations 105 may communicate with the M2M devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 10 km in radius), and a femto base station may provide communication coverage for a relatively smaller geographic area (e.g., 1 km in radium). There may be overlapping coverage areas for different technologies.

The M2M devices 115 may be dispersed throughout the coverage areas 110. Each M2M device 115 may be stationary or mobile. In one configuration, the M2M devices 115 may be able to communicate with different types of base stations such as, but not limited to, macro base stations, pico base stations, and femto base stations. The M2M devices 115 may be sensors and/or meters that monitor and/or track other devices, environmental conditions, etc. The information collected by the M2M devices 115 may be transmitted across a network that includes a base station 105 to a back-end system, such as a server. The transmission of data to/from the M2M devices 115 may be routed through the base stations 105. The base stations 105 may communicate with the M2M devices on a forward link. In one configuration, the base stations 105 may generate a forward link frame with a number of channels to carry data and/or messages to an M2M device 115. In one example, each forward link frame may include no more than three channels. These channels may include a paging channel, an ACK channel, and a traffic channel. The length of an individual frame may be short (e.g., 20 milliseconds (ms)). In one embodiment, four frames may be joined to form a larger frame with a duration of 80 ms. Each frame included in the larger frame may include no more than three channels such as the paging channel, the ACK channel, and the traffic channel. The paging and ACK channels of each frame may have a length of 5 ms while the traffic channel of each frame may have a length of 10 ms. An M2M device 115 may wake up and monitor only the individual frames (within the larger frame) that include data and/or messages on its channels that are intended for that M2M device 115.

In one embodiment, M2M devices 115 may be incorporated in other devices or the M2M devices 115 may be standalone devices. For example, devices such as cellular phones and wireless communications devices, personal digital assistants (PDAs), other handheld devices, netbooks, notebook computers, surveillance cameras, handled medical scanning devices, home appliances, etc. may include one or more M2M devices 115.

In one example, the network controller 120 may be coupled to a set of base stations 105 and provide coordination and control for these base stations 105. The controller 120 may communicate with the base stations 105 via a backhaul (e.g., core network 125). The base stations 105 may also communicate with one another directly or indirectly and/or via wireless or wireline backhaul.

Figure 2:
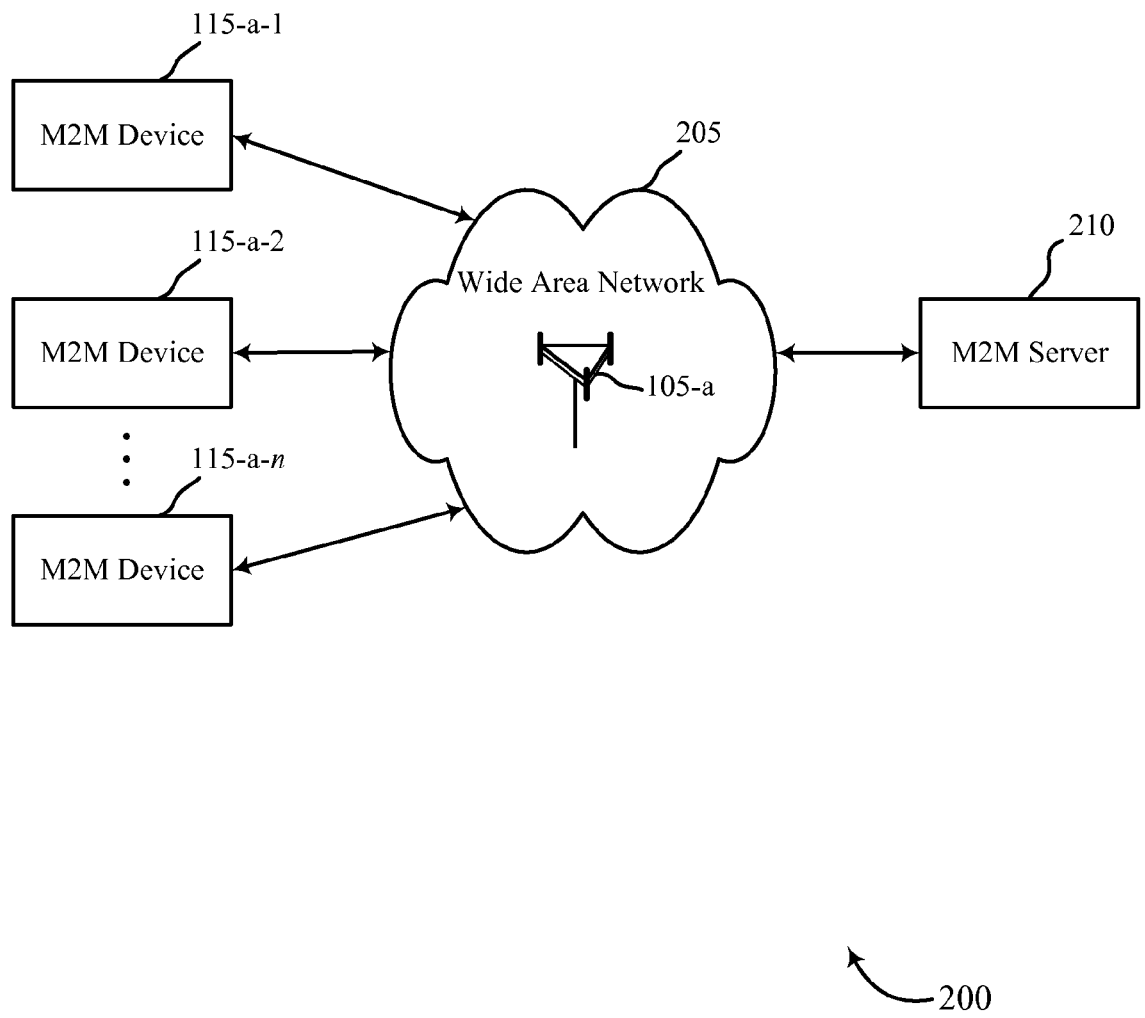
FIG. 2 illustrates an example of a wireless communication system including a wireless wide area network (WAN) implementing M2M communications.

FIG. 2 illustrates an example of a wireless communication system 200 including a wireless wide area network (WAN) 205 implementing an M2M service according to one aspect. The system 200 may include a number of M2M devices 115-*a* and an M2M server 210. Communications between the server 210 and M2M devices 115 may be routed through a base station 105, that may be considered part of the WAN 205. The base station 105-*a* may be an example of the base stations illustrated in FIG. 1. The M2M devices 115-*a* may be examples of the M2M devices 115 illustrated in FIG. 1. One skilled in the art would understand that the quantity of M2M devices 115-*a*, WANs 205, and M2M servers 210 shown in FIG. 2 is for illustration purposes only and should not be construed as limiting.

The wireless communication system 200 may be operable to facilitate M2M communications. M2M communications may include communications between one or more devices without human intervention. In one example, M2M communications may include the automated exchange of data between a remote machine, such as an M2M device 115-*a*, and a back-end IT infrastructure, such as the M2M server 210, without user intervention. The transfer of data from an M2M device 115-*a* to the M2M server 210 via the WAN 205 (e.g., the base station 105-*a*) may be performed using reverse link communications. Data collected by the M2M devices 115-*a* (e.g., monitoring data, sensor data, meter data, etc.) may be transferred to the M2M server 210 on the reverse link communications.

The transfer of data from the M2M server 210 to an M2M device 115-*a* via the base station 105-*a* may be performed via forward link communications. The forward link may be used to send instructions, software updates, and/or messages to the M2M devices 115-*a*. The instructions may instruct the M2M devices 115-*a* to remotely monitor equipment, environmental conditions, etc. M2M communications may be used with various applications such as, but not limited to, remote monitoring, measurement and condition recording, fleet management and asset tracking, in-field data collection, distribution, and storage, etc. The base station 105-*a* may generate one or more forward link frames with a small number of channels to transmit instructions, software updates, and/or messages. The various M2M devices 115-*a* may wake up to monitor a specific frame when instructions or other data is included on a channel of that frame.

In one configuration, different types of M2M communications may be proposed in different wireless access networks that use different addressing formats. Different addressing formats may lead to different types of M2M devices 115-*a* being used for different services. In one aspect, an M2M network may be implemented which may maintain the M2M devices 115-*a* independent of the WAN technology that is used to communicate with the M2M server 210. In such an aspect, the M2M devices 115-*a* and the M2M server 210 may be made independent of the WAN technology that is used. As a result, a WAN technology used for backhaul communication may be replaced with a different WAN technology, without affecting the M2M devices 115-*a* that may already be installed. For example, the M2M server 210 and an M2M device 115-*a* may communicate with each other irrespective of the addressing format used by the WAN technology since the addressing format used by the M2M device 115-*a* may not be tied with the addressing used by the implemented WAN technology.

In one embodiment, the behavior of the M2M devices 115-*a* may be pre-defined. For example, the day, time, etc. to monitor another device and transmit the collected information may be pre-defined for an M2M device 115-*a*. For example, the M2M device 115-*a*-1 may be programmed to begin monitoring another device and collect information about that other device at a first pre-defined time period. The device 115-*a*-1 may also be programmed to transmit the collected information at a second pre-defined time period. The behavior of an M2M device 115-*a* may be remotely programmed to the device 115-*a*.

Figure 3A:
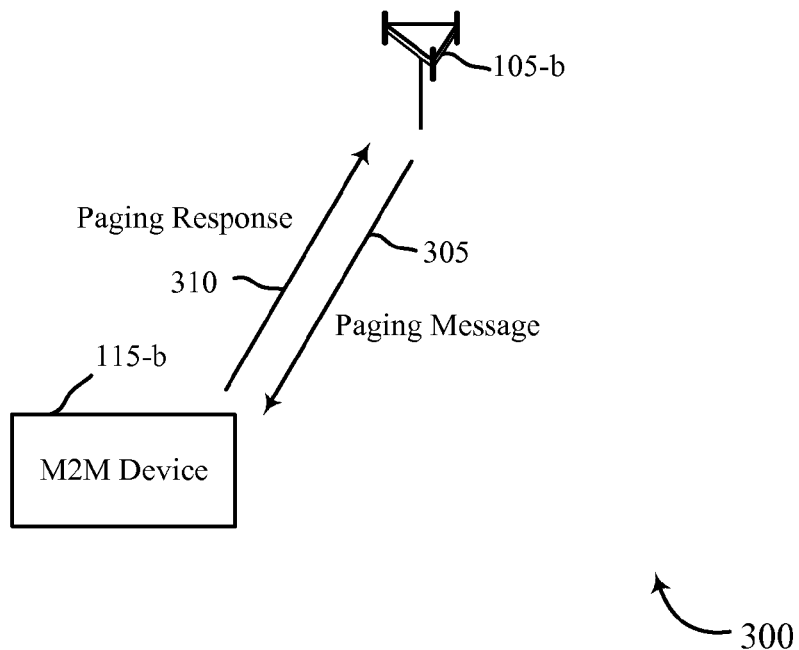
FIG. 3A shows a block diagram illustrating one embodiment of a paging system.

FIG. 3A is a block diagram illustrating one embodiment of a paging system 300 including a base station 105-*b* and an M2M device 115-*b*. The base station 105-*b* may be an example of the base stations 105 of FIG. 1 or 2. The M2M device 115-*b* may be an example of the M2M devices 115 of FIG. 1 or 2.

In a wireless communication system, such as the systems of FIG. 1 or 2, the notions of sleep state and paging are important to provide network connectivity to a large population of devices (e.g., M2M devices 115) in a battery power and air link resource efficient manner. A sleep state may provide the M2M device 115-*b* with a mode of operation to minimize battery power consumption by shutting down the whole or a part of the devices' transmit/receive circuitry. In addition, an M2M device in the sleep state may not be allocated any dedicated air link resource and therefore a large number of M2M devices may be simultaneously supported. During time intervals where the M2M device 115-*b* has no traffic activity, the device 115-*b* may remain in the sleep state to conserve resources.

Paging may involve the M2M device 115-*b* waking up periodically from the sleep state, and having the M2M device 115-*b* operate to receive and process a paging message 305 in the forward link communications (e.g., communications from the base station 105-*b* to the M2M device 115-*b*). The base station 105-*b* may be aware when the M2M device 115-*b* should wake up. Thus, if the base station 105-*b* intends to contact, or page, the M2M device 115-*b*, the base station 105-*b* may send the paging message 305 in a paging channel of a forward link frame at the time when the M2M device 305 is scheduled to wake up and monitor the paging channel. If the base station 105-*b* does not receive a paging response 310 confirming that the M2M device 115-*b* has received the paging message, the base station 105-*b* may retransmit the paging message 305 on the paging channel more frequently. The base station 105-*b* may retransmit the paging message 305 until either the M2M device 115-*b* receives the paging message 305 and transmits a paging response 310 and/or a certain number of transmissions of the paging message 305 has occurred.

In one configuration, the base station 105-*b* may transmit paging messages 305 using one or more sub-channels of the paging channel. For example, the base station 105-*b* may transmit a first paging message on a first sub-paging channel at a first paging cycle. The base station 105-*b* may also transmit a second paging message on a second sub-paging channel at a second paging cycle. In some instances, the first paging message and the second paging message may be the same (e.g., the paging message 305). In addition, the first and second sub-paging channels may also be the same. In one embodiment, the paging message 305 may be transmitted on the second sub-channel more frequently than the frequency of transmissions that occurred on the first sub-paging channel.

The time interval between two successive wake-up periods of an M2M device 115-*b* may be referred to as a paging cycle. The M2M device 115-*b* may operate in a sleep state during the portion of the paging cycle when the M2M device 115-*b* is not performing processing related to receiving a paging message 305. In order to maximize the benefit of the sleep state, the paging system 300 may use a large value for the paging cycle. For example, in a data system, the paging cycle may be about 5 seconds. As mentioned above, if the base station 105-*b* does not receive the paging response 310 indicating the successful receipt of the paging message 305, the base station 105-*b* may retransmit the paging message 305 using a smaller paging cycle until the paging response 310 is received. The retransmission of the paging message 305 may occur using the same channel or a different channel.

Upon receiving the paging message 305, the M2M device 115-*b* may carry out any operations specified in the paging message 305. For example, the M2M device 115-*b* may just receive the paging message 305 and go back to the sleep state. Alternatively, the M2M device 115-*b* may access the base station 105-*b* to establish an active connection with the base station 105-*b*.

Figure 3B:
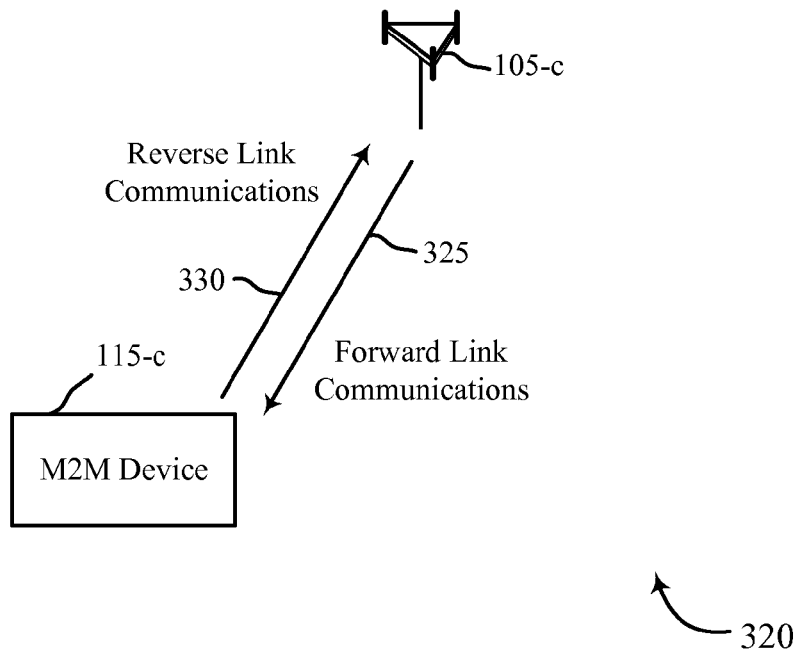
FIG. 3B is a block diagram illustrating one embodiment of a wireless communications system.

FIG. 3B is a block diagram illustrating one embodiment of a wireless communications system 320. The system 320 may include a base station 105-*c* and an M2M device 115-*c*. The base station 105-*c* and the M2M device 115-*c* may be examples of the base stations and M2M devices of FIG. 1, 2, or 3A. In one configuration, the base station 105-*c* may communicate with the M2M device 115-*c* using a forward link frame with a limited number of channels for forward link communications 325. The M2M device 115-*c* may communicate with the base station 105-*c* using reverse link communications 330. Communications that occur using the forward and reverse link communications may be M2M communications, as described above. These communications may take various forms, depending principally on the air interface protocol used by the base station 105-*c* and the M2M device 115-*c*.

The base station 115-*c* may be arranged to communicate on one or more carrier frequencies, typically using a pair of frequency bands to define the forward and reverse links communications, respectively. The base station 115-*c* may also include a set of directional antenna elements arranged to define multiple cell sectors. M2M communications in each sector on a given carrier frequency may be distinguished from communications in other sectors by modulating the communications in the given sector with a sector-specific code, such as a pseudo-random noise offset ("PN offset"). Further, M2M communications in each sector may be divided into control and traffic channels, each of which may be defined through time division multiplexing (TDM).

In one embodiment, signals may be transmitted on the forward link communications 325 and the reverse link communications 330 in a frame format. Within the frame format, information may be packetized and formatted according to the actual payload data to be communicated over the communication links 325, 330. In one configuration, the format of a frame transmitted on the forward link communications 325 may include various channels. In one embodiment, the frame may include the paging channel, the ACK channel, and the traffic channel. As mentioned above, the paging channel may be used to transmit paging messages 305 and/or system information to the M2M device 115-*c*. The ACK channel may be used to transmit an ACK message to an M2M device when a signal is successfully received at the base station 105-*c*. The traffic channel may be used to transmit data to the M2M device 115-*c*. Frames used on the forward link communications 325 in M2M communications may be based on a short duty cycle.

To conserver power, an M2M device 115 may wake up only during specific channels of specific forward link frames to receive data, paging messages 305, etc. As a result, the frame structure in M2M communications may be slotted for each M2M device. For example, a first frame may include a first paging slot (or first paging channel) that carries data intended for a first M2M device 115. A second, third, and fourth frame may include a second, third, and fourth paging slot, respectively. A second, third, and fourth M2M device may receive data on these slots, respectively. In one embodiment, the M2M device 115-*c* may use a set of hashing functions on its identification (ID), on the number of slots at the expected data rate, and on a total number of users at the expected data rate to determine the slot where the device 115-*c* can expect to receive its data. Thus, each device 115 may only be required to wake up for the slot or channel of the frame that is needed to retrieve its data. As a result, battery power of the M2M devices 115 and air interface resources in the wireless M2M WAN may be conserved.

In one configuration, to preserve communication resources, the M2M device 115-*c* may perform opportunistic decoding of a message transmitted from the base station 105-*c* in order to return to the sleep state, according to the present systems and methods. In one embodiment, the base station 105-*c* may generate one or more forward link frames and transmit multiple copies of a message to the M2M device 115-*c* using a channel of the one or more forward link frames. Each copy of the message may be sent in a sub-channel of the channel of the frames at a high data rate. The M2M device 115-*c* may read as many copies of the message as are needed to successfully demodulate the message. In one configuration, the M2M device 115-*c* may estimate the number of copies of the message it needs to receive to decode the message based on the received signal strength from a pilot signal transmitted from the base station 105-*c*. Upon successfully decoding the message, the device 115-*c* may return to a sleep state before generating and transmitting an ACK message back to the base station 105-*c*. If additional copies of the message remain in the sub-channels, the base station 105-*c* may continue to transmit the additional copies. In one configuration, the device 115-*c* may conserve battery power by not transmitting an ACK message to the base station indicating that the message has been received.

In one embodiment, the reverse link communications 330 may be terminated early to conserve the battery power of the M2M device 115-*c* and air interface resources between the M2M device 115-*c* and the base station 105-*c*. As stated above, a forward link frame may include an ACK channel. The base station 105-*c* may use the ACK channel to acknowledge the reception of a reverse link physical layer packet sent from the M2M device 115-*c* using the reverse link communications 330. In one configuration, ACKs corresponding to higher reverse link data rates may be transmitted at higher forward link data rate from the base station 105-*c* to the M2M device 115-*c*. ACKs corresponding to lower reverse link data rates may be transmitted at lower forward link data rates. As a result, rather than sending each ACK at the lowest data rate, it may be sent at two different data rates, resulting in two different packet formats. When ACKs are transmitted at higher data rates to the M2M device 115-*c*, the device 115-*c* may receive and decode the ACK more quickly, thus terminating the reverse link communications 330 at an earlier time period than if the ACK was transmitted using a low data rate.

In one configuration, the operating band of the reverse link communications 330 may be divided into multiple reverse link frequency channels. Within each frequency channel, CDMA techniques may be used to multiplex the reverse link communications for multiple M2M devices 115. In one example, each reverse link frequency channel may have its own rise over thermal (ROT) operation point. At least one frequency channel may be dedicated as a low data rate random access channel. Dividing the operating band of the reverse link communications 330 may provide a low ROT operation target (e.g., 1 decibel (dB) or less) for reverse link communications. A low ROT may reduce the link budget requirement for those devices in locations with large path loss.

In one example, to increase the power efficiency of the M2M device 115-*c*, a narrowband frequency-division multiple access (FDMA) technique may be used for the reverse link communications 330. This technique may include dividing the operating band of the reverse link communications 330 into a number of narrowband frequency channels. The base station 105-*c* may broadcast the status and assignment of each narrowband channel to each M2M device 115. The status may be "busy" or "idle". In one embodiment, the M2M device 115-*c* may only transmit data if a narrowband frequency channel is assigned to the device 115-*c*. The early termination of the reverse link communications 330 (described above) may be incorporated into the narrowband FDMA technique to exploit the signal-to-interference noise ratio (SINR) distribution and to support multiple data rates in the reverse link communications 330.

Figure 4A:
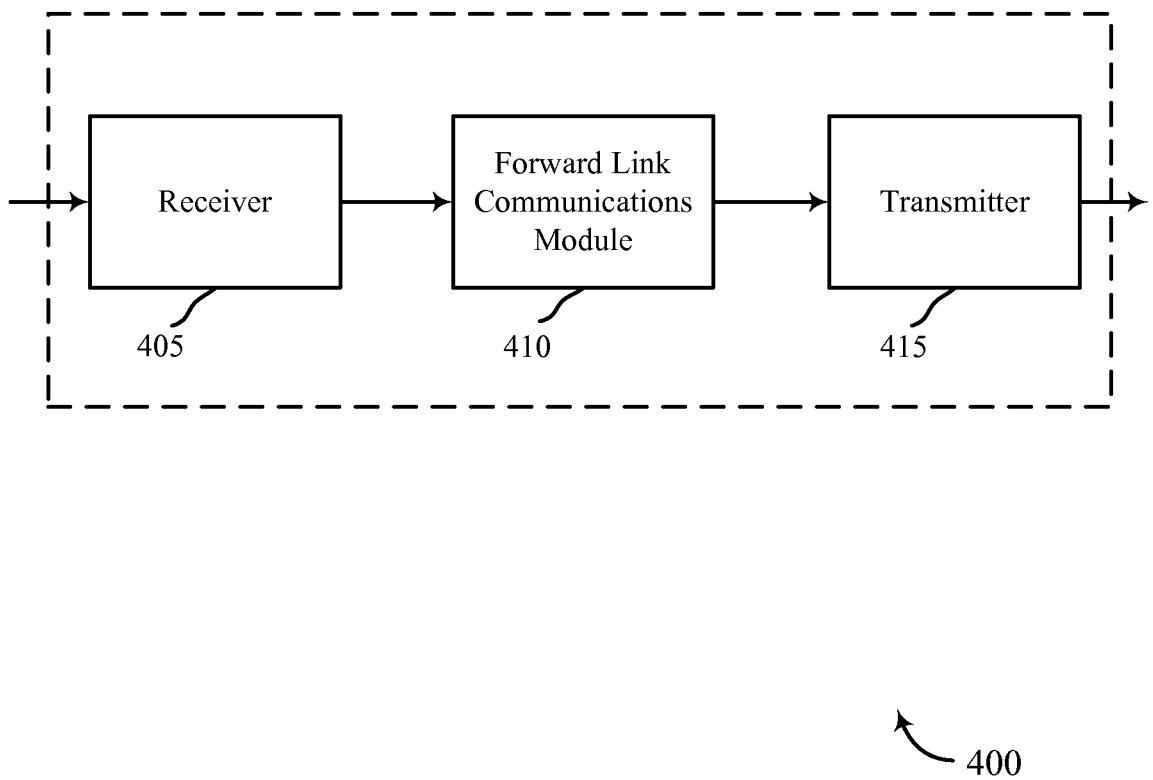
FIG. 4A is a block diagram illustrating a device for managing forward link communications in accordance with various embodiments.

Turning next to FIG. 4A, a block diagram illustrates a device 400 for managing forward link communications in accordance with various embodiments. The device 400 may be an example of one or more aspects of base stations 105 described with reference to FIGS. 1, 2, 3A, and/or 3B. The device 400 may also be a processor. The device 400 may include a receiver module 405, a forward link communications module 410, and/or a transmitter module 415. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as packet, data, and/or signaling information regarding what the device 400 has received or transmitted. The received information may be utilized by the forward link communications module 410 for a variety of purposes.

The receiver module 405 may be configured to receive a reverse link physical layer packet sent from an M2M device 115 using reverse link communications 330. The receiver module 405 may also be configured to receive instructions, a set of operations, messages, etc. from a back-end server to communicate to an M2M device 115. The forward link communications module 410 may generate one or more forward link frames. The frames may be short duty cycle frames that include a minimal number of channels and are slotted for communications with multiple M2M devices. Details regarding the generation of the forward link frame will be described below.

The forward link communications module 410 may generate an ACK message indicating a packet has been successfully received on the reverse link 330. The transmitter module 415 may be configured to transmit the ACK message in the forward link frame to the M2M device 115. Instead of transmitting the ACK channel in the forward link frame at the lowest data rate, it may be transmitted at a higher data rate, resulting in an increase in the forward link ACK throughput and early termination of communications received on the reverse link 330 by the receiver 405, as previously described.

In one embodiment, the forward link communications module 410 may generate a paging message 305 to transmit to an M2M device 115 via the transmitter module 415. The paging message 305 may alert the M2M device 115 that data intended for the device 115 is available on the traffic channel of the forward link frame. The receiver module 405 may receive a paging response 310 when the M2M device 115 successfully receives the paging message 305. When the receiver module 405 does not receive the paging response 310, the forward link communications module 410 may be configured to instruct the transmitter module 415 to retransmit the paging message 305. The transmitter module 415 may retransmit the message 305 at a higher frequency than the original transmission of the paging message 305. The transmitter module 415 may cease the retransmission when a paging response 310 is received by the receiver module 405 and/or after a certain number of retransmissions of the message 305 have been transmitted. The transmitter module 415 may transmit and retransmit the paging messages 305 on the same paging channel or different paging channels of different forward link frames. In one configuration, when the paging channel is not needed to transmit a paging message 305, the forward link communications module 410 may generate and insert system information into the paging channel of the forward link frame. The transmitter module 415 may transmit the system information to an M2M device 115 in the paging channel of the frame. In one configuration, the transmitter 415 may transmit information using multiple paging channels of multiple frames. Each paging channel may have a different paging cycle.

Figure 4B:
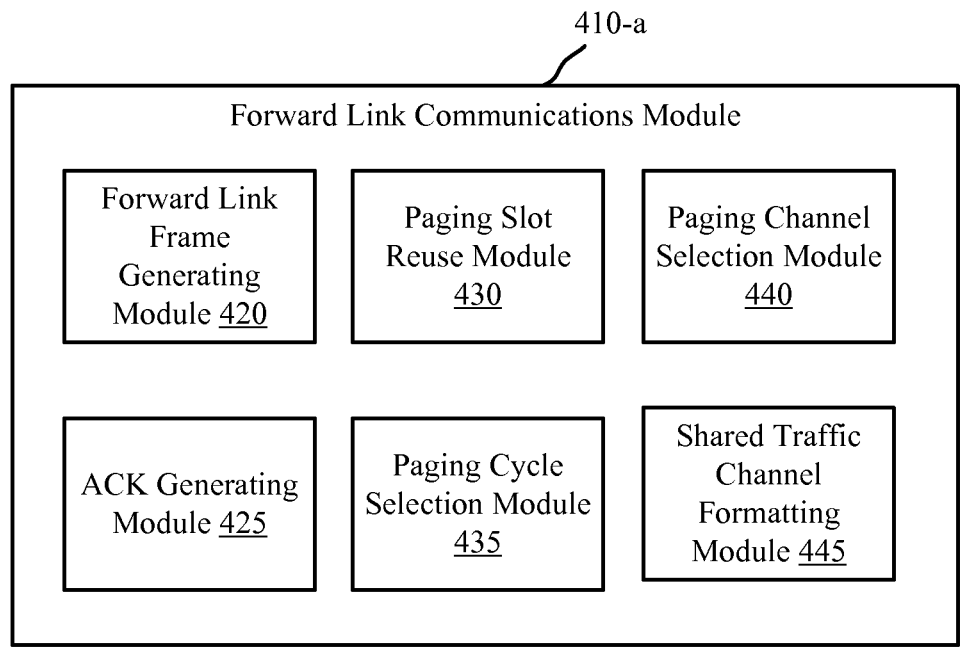
FIG. 4B is a block diagram illustrating one embodiment of a forward link communications module.

FIG. 4B is a block diagram illustrating one embodiment of a forward link communications module 410-a. The module 410-a may be an example of the forward link communications module of FIG. 4A. In one example, the module 410-a may include a forward link frame generating module 420, an ACK generating module 425, a paging slot reuse module 430, a paging cycle selection module 435, a paging channel selection module 440, and a shared traffic channel formatting module 445.

The forward link frame generating module 420 may generate a physical layer frame to be used for communications on the forward link 325 (e.g., from a base station to an M2M device). The generated frame may be based on a short duty cycle and a small number of slotted physical layer channels. For example, the module 420 may generate a forward link physical layer frame that is a total of 20 milliseconds (ms). As a result, an M2M device 115 may only need to wake up for 20 ms to receive the forward link frame. Thus, power may be conserved at the M2M device 115. The slotted operation of the frame generated by the module 420 may allow the M2M device 115 to wake up and turn on its radio only during the scheduled slot (or channel) of the frame where it is expecting data.

Each of the physical channels of the forward link frame may include both pilot symbols and data symbols, which may be time division multiplexed (TDM). In one configuration, a forward link frame generated by the module 420 may include a paging channel (or slot), an ACK channel, and a traffic channel. The paging channel may be used to transmit paging messages and other information to an M2M device 115 on the forward link communications 325. The ACK channel may transmit ACK messages and additional information while the traffic channel may be used to transmit data messages to an M2M device 115.

The ACK generating module 425 may generate an ACK message to transmit on the forward link communications 325. The message may be transmitted on an ACK channel that is part of the forward link frame generated by the forward link frame generating module 420. In one configuration, the forward link frame may be used to transmit a compressed identification (ID) to an M2M device 115. The compressed ID may be a hash of the network ID of the M2M device 115. The compressed ID may represent an ACK message for the M2M device 115 indicating that the base station successfully received a packet transmitted from the M2M device on the reverse link. In one configuration, the ACK generating module 425 may group the compressed ID for one M2M device together with compressed IDs of other M2M devices to create an ACK packet. ACK packets may include different quantities of compressed IDs. The transmission data rate of ACK packets may fluctuate depending on the number of compressed IDs in each packet. An ACK packet with a higher number of compressed IDs may be transmitted at a higher data rate than an ACK packet with a lower number of compressed IDs.

In some instances, a paging slot may be idle for a certain forward link frame. For example, the paging slot may not be scheduled to transmit a paging message 305 for an M2M device 115. The paging slot reuse module 430 may reuse the idle paging slot to communicate system information to the M2M device 115. The system information may include system timing and sector number information. Thus, the establishment of additional channels within the forward link frame to convey the system information to an M2M device 115 may be avoided. Instead, the paging slot reuse module 430 may insert the system information in an idle paging slot (or channel) of the frame.

In one embodiment, the paging cycle selection module 435 may select a particular paging cycle to transmit paging messages to an M2M device. The module 435 may provide a flexible paging scheme to dynamically change the paging cycle for an M2M device 115 in an M2M wireless WAN. The paging cycle selection module 435 may dynamically change the paging cycle depending on whether a paging response 310 is received from the device 115, the time of day, the state of operation of the M2M device 115, etc.

In one configuration, the paging channel selection module 440 may select between a primary and secondary paging channel to transmit a paging message to an M2M device 115 using the forward link communications 325. The module 440 may provide a paging scheme that allows for paging messages to be transmitted at different paging cycles in an M2M WAN using primary and secondary paging channels. The primary and second paging channels may be sub-channels of the paging channel of a frame. The primary paging channel may be used for longer paging cycles while the secondary paging channel may be used for shorter paging cycles. In one example, a base station 105 may transmit a first paging message and the module 440 may select the primary channel to transmit this message since it is to be transmitted at a first paging cycle. The base station may also transmit a second paging message and the module 440 may select the secondary paging channel to transmit the second paging message since the second message is to be transmitted at a second paging cycle. In one embodiment, the second paging cycle may be shorter than the first paging cycle.

The shared traffic channel formatting module 445 may format a traffic channel in the forward link frame that may be shared by multiple M2M devices. When a M2M device 115 is expecting data on a shared traffic channel within a given traffic channel cycle, the device 115 may continue reading the traffic channel slots across multiple forward link frames during a traffic channel cycle until it finds its data as indicated by the ID field. As a result, the M2M device 115 may stay awake longer than necessary to find its data. The formatting module 445 may format the traffic channel in such a way so as to minimize the wake up time for the M2M device 115. The M2M device 115 may determine which slot of a particular frame to wake up in order to get its data on the shared traffic channel. To determine which slot to wake up for, the M2M device may use a set of hashing function on its ID. The M2M device may also use the number of slots at the expected data rate and the total number of users at that rate to determine the slot where it can expect to receive its data. The traffic channel may be formatted by the module 445 to allow the device to determine which slot to use. For example, the module 445 may format the shared traffic channel so that the hashed slot either contains the data or a pointer to a slot where the actual data is located. If a slot of a first frame cannot contain all the pointers, the module 445 may set an overflow flag and provide a pointer to another slot of another frame where the hashed M2M device can check for its data. If all the data for the M2M device 115 cannot be accommodated into a single slot, then the module 445 may format a trailer field of the channel to include a pointer to another slot where the remaining data is transmitted.

Figure 5A:
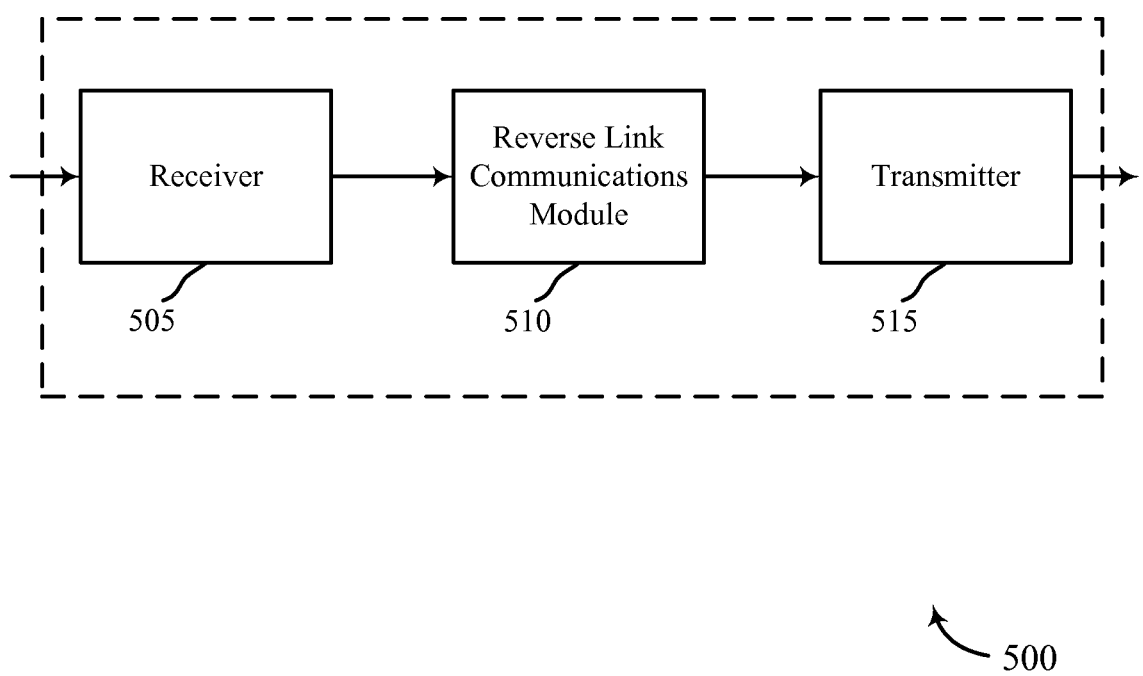
FIG. 5A is a block diagram illustrating a device for managing reverse link communications in accordance with various embodiments.

FIG. 5A is a block diagram illustrating a device 500 for managing reverse link communications in accordance with various embodiments. The device 500 may be an example of one or more aspects of the M2M device 115 described with reference to FIGS. 1, 2, 3A, and/or 3B. The device 500 may also be a processor. The device 500 may include a receiver module 505, a reverse link communications module 510, and/or a transmitter module 515. Each of these components may be in communication with each other.

These components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may receive information such as packet, data, and/or signaling information regarding what the device 500 has received or transmitted. The received information may be utilized by the reverse link communications module 510 for a variety of purposes.

The receiver module 505 may be configured to receive a forward link physical layer packet sent from a base station 105 using forward link communications 325. The reverse link communications module 510 may generate a reverse link frame that includes a traffic channel to transmit data from an M2M device 115 to a base station 105.

In one embodiment, the reverse link communications module 510 may cause communications on the reverse link to terminate early. As previously explained, the forward link frame may include an ACK channel to transmit ACK messages from the base station 105 to an M2M device 115 at a high data rate. ACK messages corresponding to higher reverse link data rates may be received by the receiver module 505 at the higher data rate. Upon receiving the ACK message, the reverse link communications module 510 may instruct the transmitter 515 to cease transmitting communications on the reverse link communications 330. Details regarding the reverse link communication module 510 will be described below.

Figure 5B:
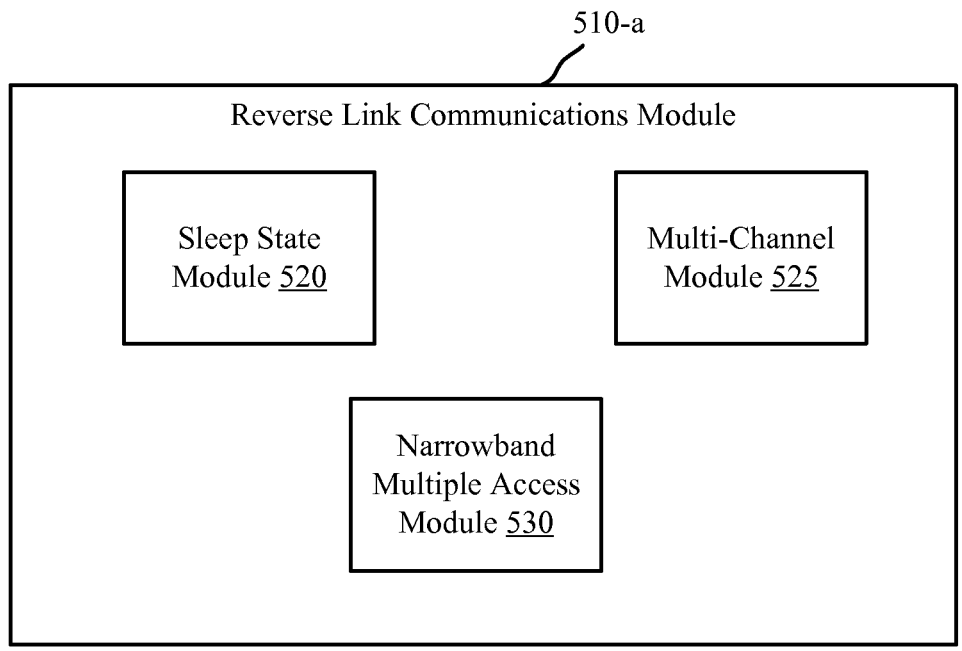
FIG. 5B is a block diagram illustrating one embodiment of a reverse link communications module.

FIG. 5B is a block diagram illustrating one embodiment of a reverse link communications module 510-a. The module 510-a may be an example of the reverse link communications module of FIG. 5A. In one example, the module 510-a may include a sleep state module 520, a multi-channel module 525, and a narrowband multiple access module 530.

In one configuration, the sleep state module 520 may allow an M2M device 115 to wake up long enough to receive a message from a base station 105 and then return to a sleep state to conserve power. The base station may transmit a message to the M2M device using a forward link frame. The frame may include a paging channel to carry the message. The paging channel may include a number of sub-channels. The base station may transmit a copy of the message in each sub-channel. When the M2M device successfully receives and demodulates the message on one of the sub-channels, the sleep state module 520 may cause the M2M device 115 to turn off its radio and return to a sleep state to conserve the battery without sending an ACK message back to the base station.

In one embodiment, the multi-channel module 525 may provide a code division multiple access (CDMA) based multiple access scheme to reduce negative effects of an operating rise over thermal (ROT) noise on the reverse link communications 330. In one configuration, the module 525 may divide the operating band of the reverse link into multiple reverse link frequency channels. Within each frequency channel, the module 525 may use CDMA for multiple user multiplexing.

Each frequency channel may have its own target ROT operation point. The multi-channel module 525 may dedicate at least one frequency channel as a low data rate random access channel. As a result, the operating ROT may be reduced.

In one example, the narrowband multiple access module 530 may provide a narrowband frequency division multiple access (FDMA) technique for the reverse link communications 330. The module 530 may divide the operating band into a number of narrowband frequency channels. A busy or idle status of each narrowband channel may be broadcasted to each M2M device 115. The devices may contend for a channel selected randomly from the idle set of channels by sending a preamble. The module 530 may allow the M2M device 115 to transmit data only if a channel is either implicitly or explicitly assigned to the M2M device. The module 530 may not allow the transmission to be interrupted if the channel state changes to busy.

Figure 6:
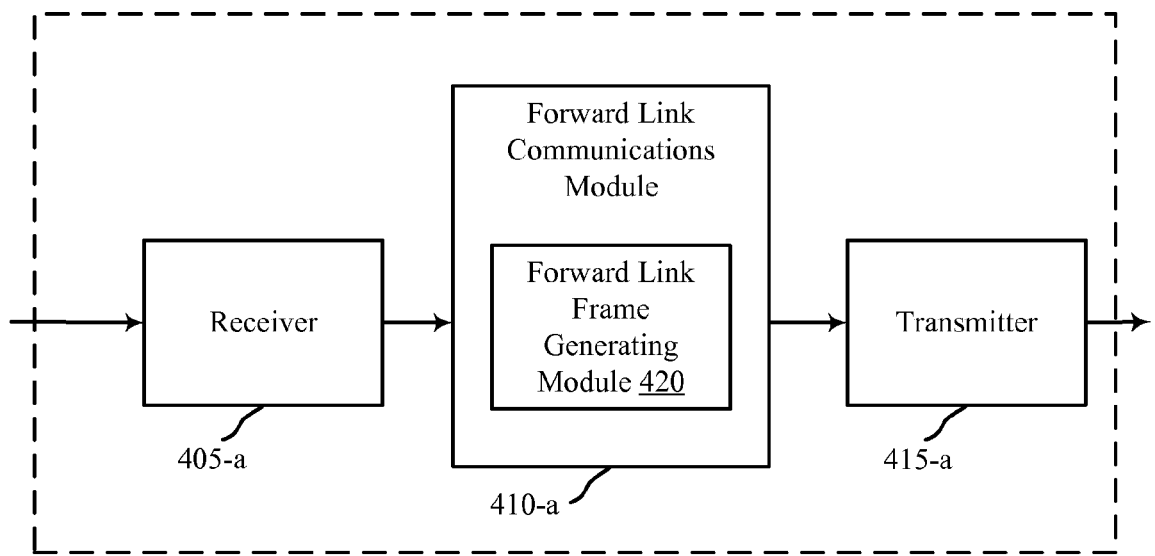
FIG. 6 is a block diagram illustrating a device for managing forward link communications in accordance with various embodiments.

FIG. 6 is a block diagram illustrating a device 600 for managing forward link communications in accordance with various embodiments. The device 600 may be an example of one or more aspects of the base station described with reference to FIGS. 1, 2, 3A, 3B, 4A, and/or 4B. The device 600 may also be a processor. The device 600 may include a receiver module 405-a, a forward link communications module 410-a, and/or a transmitter module 415-a. Each of these components may be in communication with each other.

The components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405-a may receive information such as packet, data, and/or signaling information regarding what the device 600 has received or transmitted. The received information may be utilized by the forward link communications module 410-a for a variety of purposes, as previously described.

In one configuration, the forward link communications module 410-a may include a forward link frame generating module 420. The module 420 may generate one or more frames used for transmitting communications to an M2M device 115 on the forward link. Details regarding the frame generated by the forward link frame generating module 420 will be described below.

Figure 7:
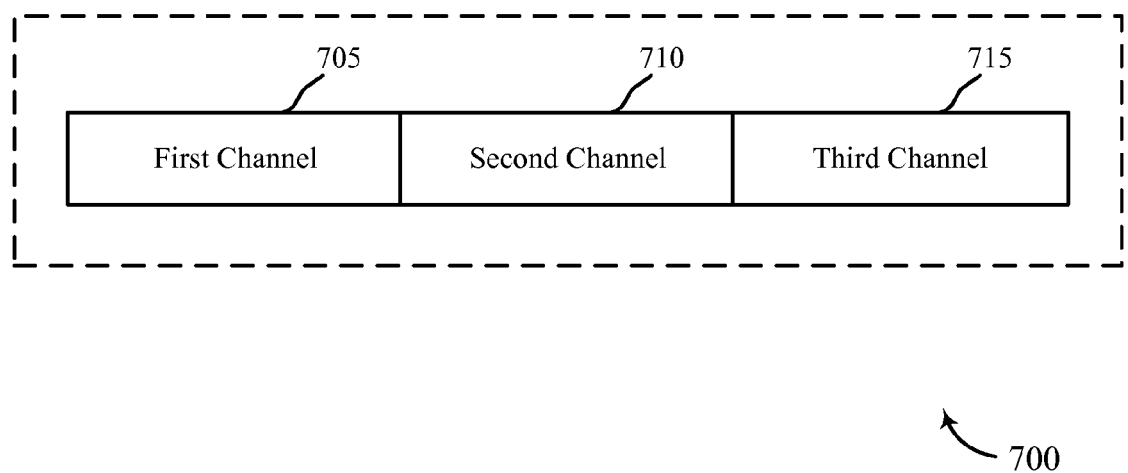
FIG. 7 is a block diagram illustrating one embodiment of a forward link frame.

FIG. 7 is a block diagram illustrating one embodiment of a forward link frame 700. In one configuration, the frame 700 may be a cyclically repeated data block that includes a fixed number of time slots. Each time slot may be for a logical TDM channel. In one example, the forward link frame 700 may be generated by the forward link frame generating module 420, described in FIG. 5B and/or FIG. 6. The frame 700 may include a first channel 705 during a first time slot, a second channel 710 during second time slot, and a third channel 715 during a third time slot. Each channel may be used to transmit various types of data to one or more M2M devices 115. These channels are described in more detail below.

Figure 8:
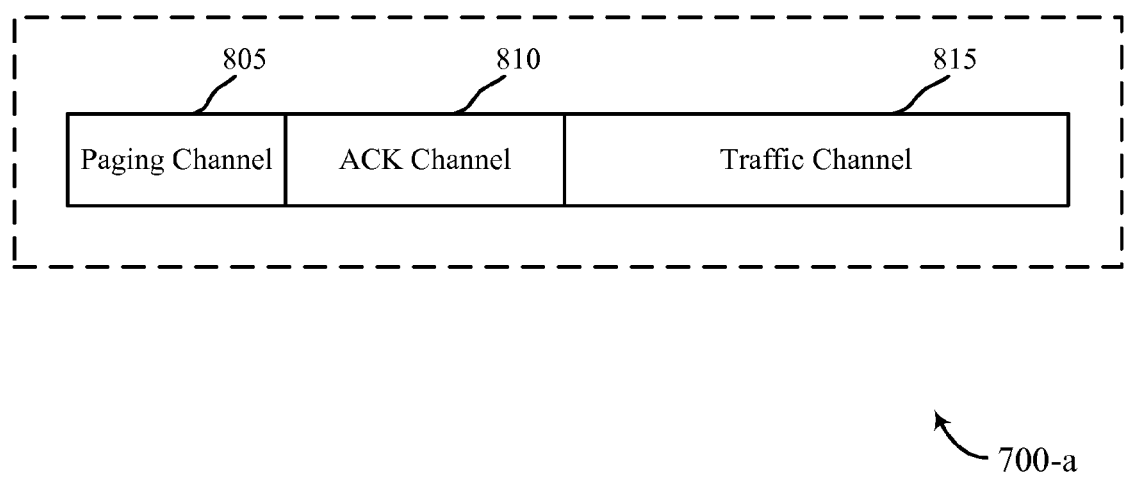
FIG. 8 is a block diagram illustrating one example of the forward link frame.

As illustrated in FIG. 8, a forward link frame 700-a may include a paging channel 805, an ACK channel 810, and a traffic channel 815. The forward link frame 700-*a* may be an example of the frame 700 illustrated in FIG. 7. In one configuration, the frame 700-*a* may be generated by the forward link frame generating module 420 of FIG. 5B and/or FIG. 6. The frame 700-*a* may be generated as a physical layer frame to be transmitted on the forward link communications 325. In one embodiment, multiple frames 700-*a* may be transmitted. Each frame may include no more than three time slots and each time slot may include one channel. Thus, each forward link frame 700-*a* may include no more than three logical TDM channels. The channels of the frame 700-*a* may include the paging channel 805, the ACK channel 810, and the traffic channel 815. In one configuration, each paging slot and ACK slot may have a length of 5 ms. Each traffic slot may have a length of 10 ms. Thus, the paging channel 805 and ACK channel 810 may transmit their data for 5 ms each. The traffic channel 815 may transmit data for 10 ms. As a result, each forward link frame 700-*a* may have a length of 20 ms.

In one embodiment, the base station 105 that transmits the frame 700-*a* on the forward link communications 325 may transmit a number of frames 700-*a* to a large geographic area (e.g., a radius of approximately 35 km). As a result, the base station 105 may transmit each forward link frame 700-*a* using a low data rate. For example, a number of forward link frames 700-*a* may be transmitted at an effective data rate of approximately 9.6 bits/second.

The paging channel 805 may be used to carry paging messages 305 to one or more M2M devices 115. In one example, the paging channel 805 may transmit the messages 305 for 5 ms for each frame 700-*a*. The paging channel 805 may also include a number of sub-channels. The sub-channels may be used to transmit multiple paging messages 305. Each sub-channel may transmit a copy of the same message 305, and/or the sub-channels may transmit different messages. In one configuration, each sub-channel may transmit the paging messages 305 at different paging cycles. Alternatively, the sub-channels may transmit the messages 305 using the same paging cycle. In one embodiment, the base station 105 may transmit a copy of a paging message 305 using multiple sub-channels. Each copy of the message 305 may be transmitted at a high data rate (e.g., 80 kbps). The sleep state module 520 may cause the M2M device 115 to enter the sleep state before transmitting an ACK message back to the base station 105 indicating that the device 115 received the paging message 305. As a result, the base station 105 may continue to transmit copies of the paging message 305 using the sub-channels of the paging channel 805 even though the M2M device 115 has successfully received the message 305.

In one embodiment, the paging channel 805 may be null (i.e., does not include a paging message 305). When a null paging channel 805 is present in the frame 700-*a*, the paging slot reuse module 430 may use the channel 805 to transmit system information to the M2M device 115 during the paging slot of the frame 700-*a*. System information may include timing information and/or information relating to the sector of the base station 105 that is communicating the frame 700-*a* to the M2M device 115.

The ACK channel 810 may be used to transmit an ACK message. The ACK message may indicate that the base station 105 has successfully received a message from an M2M device 115. In one configuration, the ACK generating module 425 may generate the ACK message to be transmitted on the ACK channel 810. As previously described, the ACK channel 810 may transmit a compressed ID of the M2M device 115 that represents the ACK message. The ACK channel 810 may transmit multiple compressed IDs for multiple M2M devices 115 as an ACK packet. In one configuration, the ACK channel 810 may transmit ACK packets at different data rates. For example, the ACK channel 810 may transmit at a higher data rate when a certain number of compressed IDs are included in the ACK packet. If a lesser number of compressed IDs are in the ACK packet, the channel 810 may transmit the packet at a lower data rate.

In one example, the traffic channel 815 may transmit a data payload to an M2M device 115. In one embodiment, the channel 815 may transmit data for multiple M2M devices 115. For example, multiple forward link frames 700-*a* may be transmitted. Each traffic time slot of each frame 700-*a* may carry data for a different M2M device 115. The shared traffic channel formatting module 445 may format the traffic channel 815 so that each M2M device 115 may determine which time slot and frame 700-*a* is carrying their data payload. For example, the module 445 may format the shared traffic channel 815 so that a slot either contains the data or a pointer to a slot where the actual data is located. If a slot cannot contain all the pointers, the module 445 may set an overflow flag and provide a pointer to another slot where the M2M device may check for its data. If all the data for the M2M device 115 cannot be accommodated into a single slot, then the module 445 may format a trailer field of the channel to include a pointer to another slot where the remaining data may be transmitted.

Figure 9:
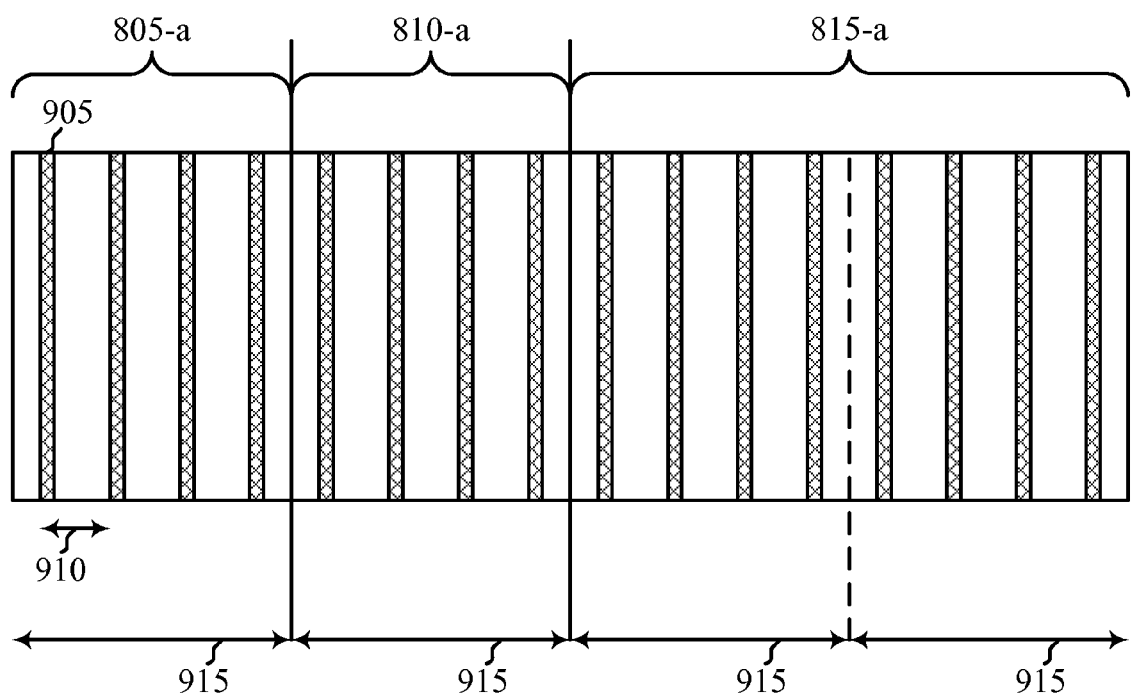
FIG. 9 is a block diagram illustrating one example of the forward link frame.

FIG. 9 is a block diagram illustrating one example of a forward link frame 700-*b*. The frame 700-*b* may be an example of the frame 700 of FIG. 7 or 8. The frame 700-*b* may include three time slots. The first time slot may be 5 ms and may include a paging channel 805-*a*. The second time slot may also be 5 ms and may include an ACK channel 810-*a*. The third time slot may be 10 ms and may include a traffic channel 815-*a*.

In one configuration, each channel of the frame 700-*b* may transmit a number of TDM pilot signals 905. Each signal 905 may include a combination of pilot symbols and data symbols. The symbols of each signal 905 may be multiplexed together using TDM techniques. In one embodiment, the data and pilot symbol combination transmitted from a base station 105 in a first cell (such as a first cell 110-*a*, illustrated in FIG. 1) may be scrambled with a pseudo-noise (PN) sequence in order to separate the data/pilot symbol combinations being transmitted from a base station in a neighboring cell (such as a second cell 110-*b*, illustrated in FIG. 1). The different cells (e.g., 110-*a*, 110-*b*, 110-*c* of FIG. 1) may use a different time offset of the same PN sequence as their scrambling code to simplify the initial cell search performed by an M2M device 115 as well as reduce the initial acquisition time of the device 115. The PN sequence may have a length of $2^{14}$ to cover four forward link frames 700 that have a length of 20 ms each (a total duration of 80 ms).

In one embodiment, the chip rate of the frame 700-*b* may be approximately 204.8 kilo chips per second (kcps). The chip rate may represent the number of pulses per second (chips per second) at which the PN sequence is transmitted. In one example, each TDM pilot signal 905 may have a length of 56 chips. A spacing 910 may exist between each pilot signal 905. The spacing 910 may be 256 chips. In one configuration, signals from different base stations may be covered by the same PN sequence but with a different initial offset. The different initial offset may be referred to as PN offset. Using a spacing of 256 chips between pilot signals 905 of a frame may result in 64 different TDM pilot signals 905. For example, each of the four forward link frames 700-*b* may include 16 TDM pilot signals 905. A TDM pilot group 915 may include four TDM pilot signals 905. Each TDM pilot group 915 may have a length of 1024 chips.

Figure 10:
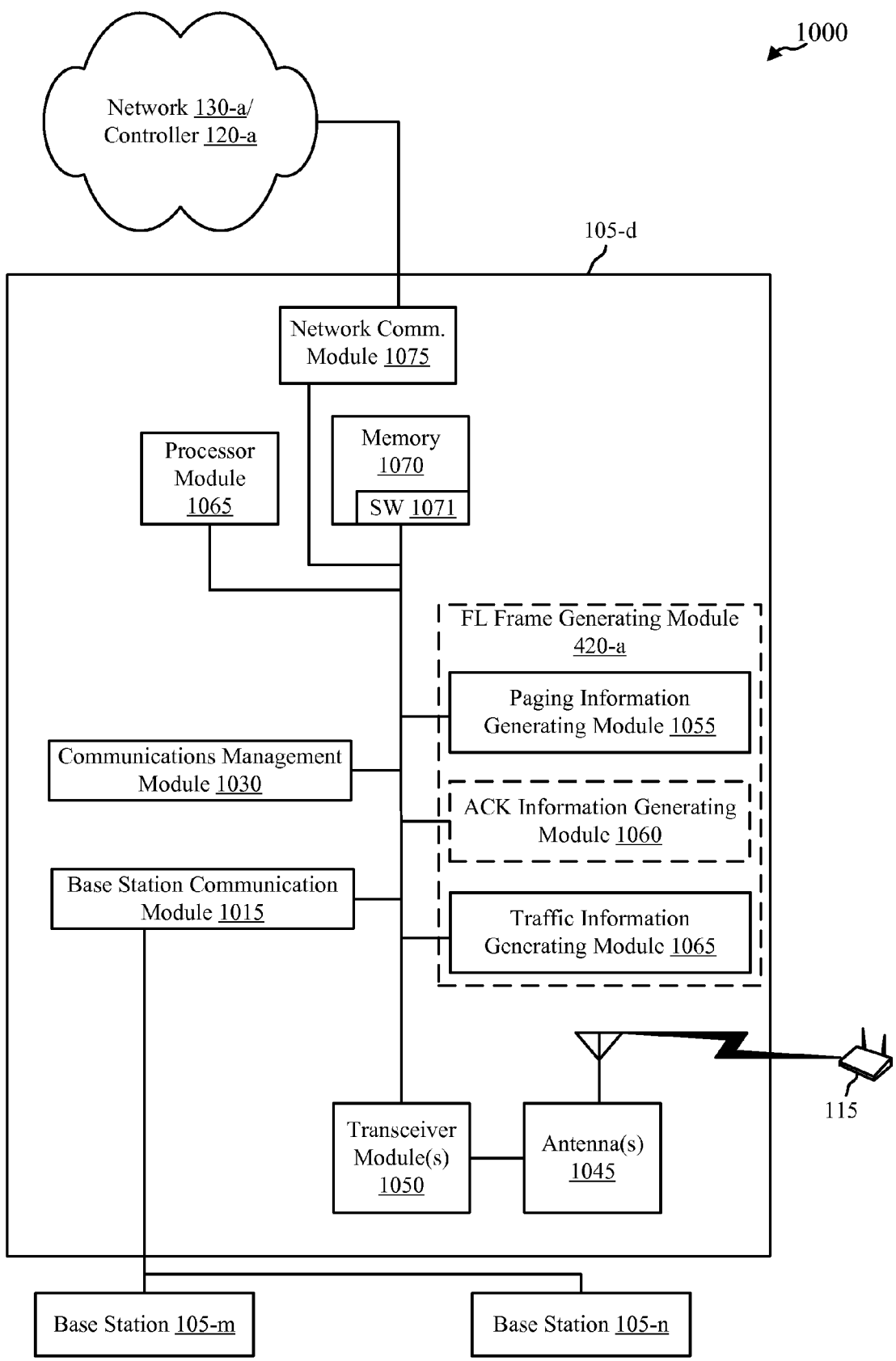
FIG. 10 shows a block diagram of a communications system that may be configured for generating a forward link frame in accordance with various embodiments.

FIG. 10 shows a block diagram of a communications system 1000 that may be configured for generating a forward link frame 700 in accordance with various embodiments. This system 1000 may be an example of aspects of the system 100 depicted in FIG. 1, system 200 of FIG. 2, system 300 of FIG. 3A, and/or system 320 of FIG. 3B.

The system 1000 may include a base station 105-d. The base station 105-d may include antennas 1045, a transceiver module 1050, memory 1070, and a processor module 1065, which each may be in communication, directly or indirectly, with each other (e.g., over one or more buses). The transceiver module 1050 may be configured to communicate bi-directionally, via the antennas 1045, with an M2M device 115, which may be a sensor, meter, or any other type of device capable of tracking, sensing, monitoring, etc. The transceiver module 1050 (and/or other components of the base station 105-d) may also be configured to communicate bi-directionally with one or more networks. In some cases, the base station 105-d may communicate with the core network 130-a and/or controller 120-a through network communications module 1075. Controller 120-a may be integrated into the base station 105-d in some cases.

Base station 105-d may also communicate with other base stations 105, such as base station 105-m and base station 105-n. Each of the base stations 105 may communicate with the M2M device 115 using different wireless communications technologies, such as different Radio Access Technologies. In some cases, base station 105-d may communicate with other base stations such as 105-m and/or 105-n utilizing base station communication module 1015. In some embodiments, base station 105-d may communicate with other base stations through controller 120-a and/or core network 130-a.

The memory 1070 may include random access memory (RAM) and read-only memory (ROM). The memory 1070 may also store computer-readable, computer-executable software code 1071 containing instructions that are configured to, when executed, cause the processor module 1065 to perform various functions described herein (e.g., frame generation, paging schemes, ACK schemes, data traffic schemes, etc.). Alternatively, the software 1071 may not be directly executable by the processor module 1065 but may be configured to cause the computer, e.g., when compiled and executed, to perform functions described herein.

The processor module 1065 may include an intelligent hardware device, e.g., a central processing unit (CPU) such as those made by Intel® Corporation or AMD®, a microcontroller, an application-specific integrated circuit (ASIC), etc. The transceiver module 1050 may include a modem configured to modulate packets for the M2M device 115 and provide the modulated packets to the antennas 1045 for transmission, and to demodulate packets received from the antennas 1045. While some examples of the base station 105-d may include a single antenna 1045, the base station 105-d preferably includes multiple antennas 1045 for multiple links which may support carrier aggregation. For example, one or more links may be used to support macro communications with the M2M device 115.

According to the architecture of FIG. 10, the base station 105-d may further include a communications management module 1030. The communications management module 1030 may manage communications with other base stations 105. By way of example, the communications management module 1030 may be a component of the base station 105-d in communication with some or all of the other components of the base station 105-d via a bus. Alternatively, functionality of the communications management module 1030 may be implemented as a component of the transceiver module 1050, as a computer program product, and/or as one or more controller elements of the processor module 1065.

The components for base station 105-d may be configured to implement aspects discussed above with respect to device 400 in FIG. 4A and may not be repeated here for the sake of brevity. For example, the forward link generating module 420-a may be an example of the module 420 of FIGS. 4A and/or 4B. The module 420-a may include paging information generating module 1055. The module 1055 may generate paging messages 305 and other information transmitted on the paging channel 805 as described in FIG. 3A, 3B, 4A, 4B, 6, 7, 8, or 9. The frame generating module 420-a may also include an ACK information generating module 1060. The module 1060 may generate an ACK message and other information to transmit on the ACK channel 810 as described in FIG. 3B, 4A, 4B, 6, 7, 8, or 9. Further, a traffic information generating module 1065 may be included as a part of the forward link frame generating module 420-a. The module 1065 may generate data and additional information to transmit on the traffic channel 815 in accordance with the present systems and methods. For example, the module 1065 may generate traffic data and other information as described in FIG. 3B, 4A, 4B, 6, 7, 8, or 9.

In some embodiments, the transceiver module 1050 in conjunction with antennas 1045, along with other possible components of base station 105-d, may transmit a number of forward link frames 700 that include a paging channel 805, an ACK channel 810, and a traffic channel 815 from the base station 105-d to the M2M device 115, to other base stations 105-m/105-n, or core network 130-a.

Figure 11:
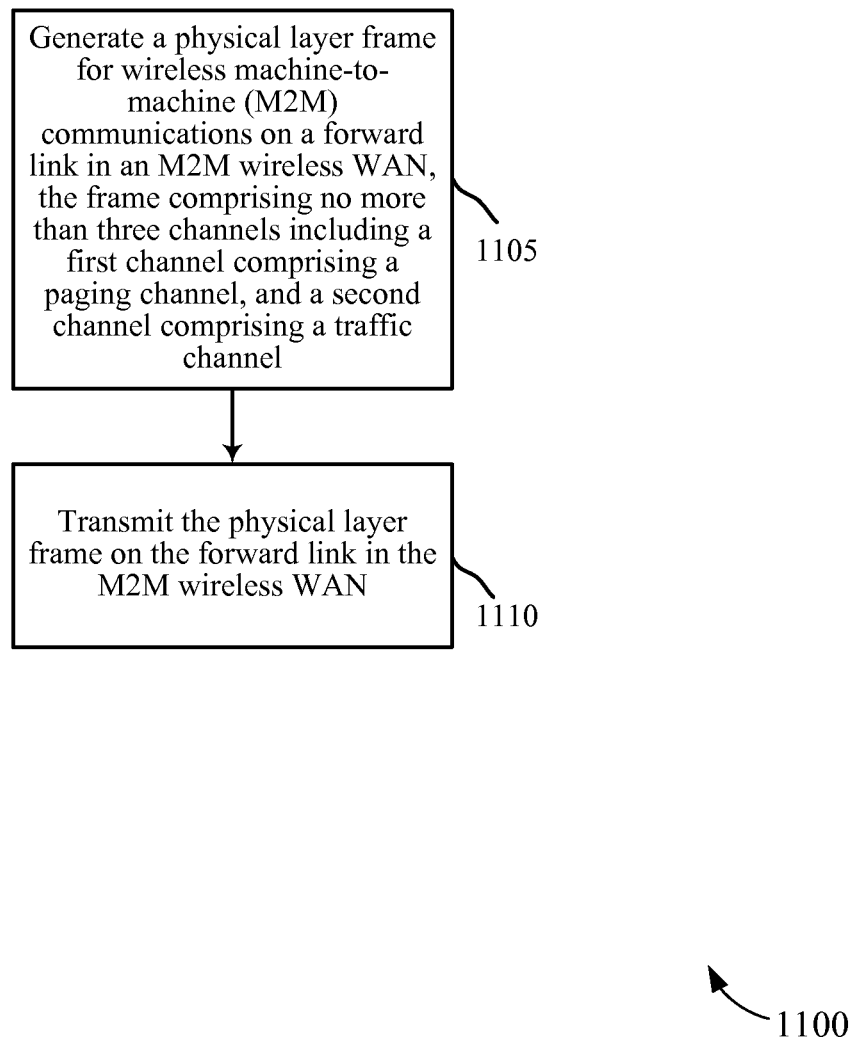
FIG. 11 is a flow chart illustrating one example of a method for managing forward link communications.

FIG. 11 is a flow chart illustrating one example of a method 1100 for managing forward link communications. For clarity, the method 1100 is described below with reference to the base station 105 shown in FIG. 1, 2, 3A, 3B, 4A, 6, or 10. In one implementation, the forward link frame generating module 420 may execute one or more sets of codes to control the functional elements of the base station 105 to perform the functions described below.

At block 1105, a physical layer frame may be generated. The frame may be for wireless M2M communication on a forward link. The communications may occur in an M2M wireless wide area network (WAN). In one configuration, a single generated frame may include no more than three channels. In one embodiment, the frame may include a first channel comprising a paging channel, and a second channel comprising a traffic channel. The first channel may be used to transmit paging messages 305 and other information from the base station 105 to the M2M device 115.

At block 1110, the physical layer frame may be transmitted on the forward link in the M2M wireless WAN. In one embodiment, the base station 105 may transmit a number of frames. For example, the base station 105 may transmit a set of four frames on the forward link. The physical layer frames may be formatted so that the M2M device 115 wakes up to monitor a specific paging slot of a certain frame to receive a paging message 305 and/or other information transmitted on the paging channel. As a result, the M2M device 115 may be in a wake mode to receive messages and/or information only during a certain time slot. After receiving the message and/or information at the designated slot, the M2M device 115 may return to a sleep state, thus conserving power.

Therefore, the method 1100 may provide for efficient communications on the forward link. It should be noted that the method 1100 is just one implementation and that the operations of the method 1100 may be rearranged or otherwise modified such that other implementations are possible.

Figure 12:
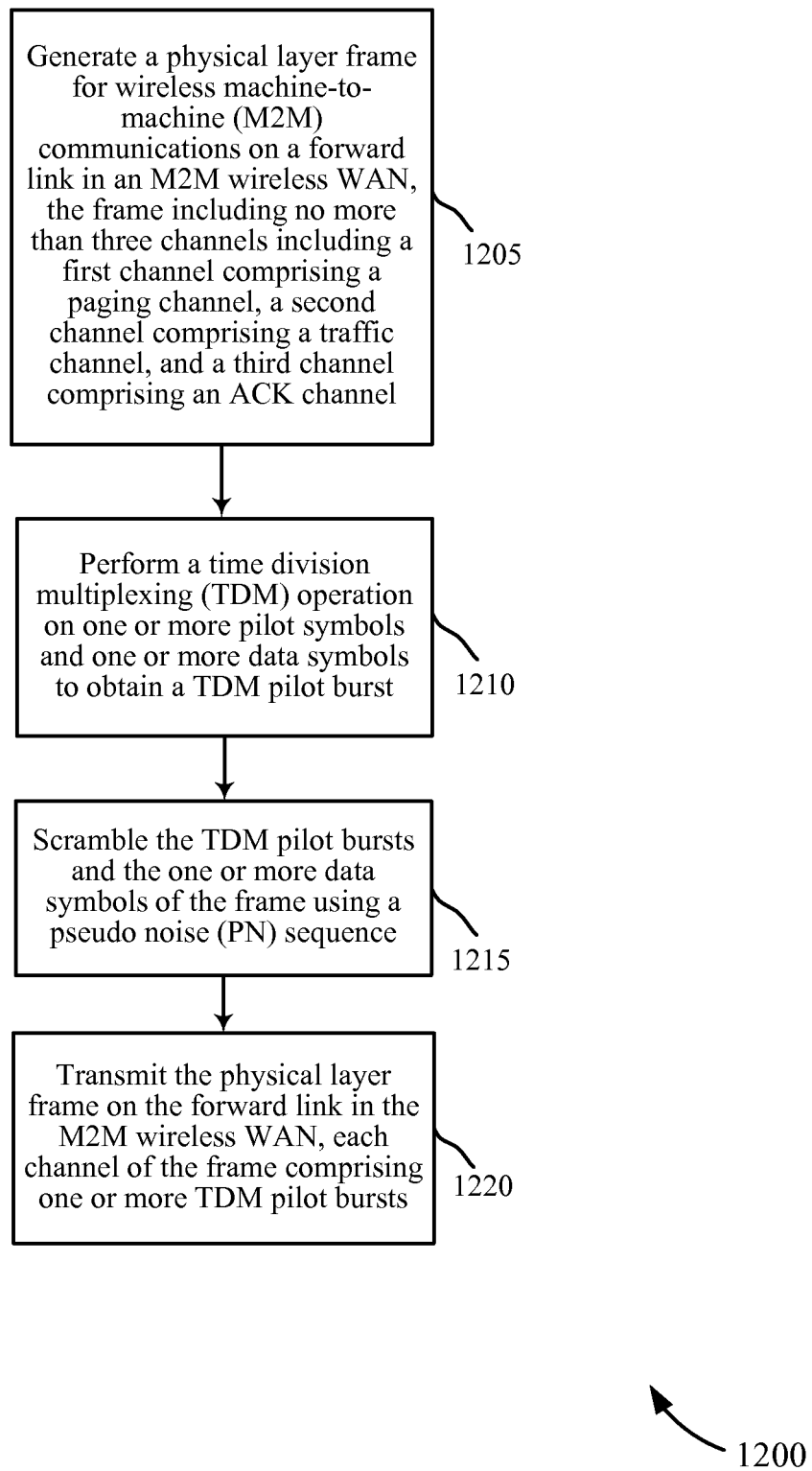
FIG. 12 is a flow chart illustrating another example of a method for managing forward link communications.

FIG. 12 is a flow chart illustrating one example of a method 1200 for managing forward link communications. For clarity, the method 1200 is described below with reference to the base station 105 shown in FIG. 1, 2, 3A, 3B, 4A, 6, or 10. In one implementation, the forward link frame generating module 420 may execute one or more sets of codes to control the functional elements of the base station 105 to perform the functions described below.

At block 1205, a physical layer for wireless M2M communications on a forward link may be generated. The frame may be used for communicating in an M2M wireless WAN. In one configuration, the frame may include no more than three channels. The three channels may include a first channel comprising a paging channel 805, a second channel comprising a traffic channel 815, and a third channel comprising an ACK channel 810.

At block 1210, a time division multiplexing (TDM) operation may be performed on one or more pilot symbols and one or more data symbols to obtain a TDM pilot burst. In one example, one or more TDM pilot bursts may be included in each channel of the forward link frame. Consecutive pilot bursts in the frame may be separated by a certain number of chips. The TDM pilot bursts may be periodic so that a TDM pilot burst may be repeated every certain number of frames. For example, a TDM pilot burst may be repeated every fourth forward link frame. At block 1215, the TDM pilot bursts and the data symbols of a frame may be scrambled using a PN sequence. A neighboring base station in a neighboring cell may also scramble the TDM pilot bursts and the data symbols using the same PN sequence. The PN sequence used by the neighboring base station, however, may be offset from the PN sequence used to scramble the pilot and data at block 1215. As a result, pilot bursts transmitted in frames from different base stations may be offset from one another to allow an M2M device 115 to more easily acquire timing information and other signals from its serving base station 105.

Therefore, the method 1200 may provide for efficient communications on the forward link by including a TDM pilot burst in each channel of the forward link frame instead of a continuous pilot signal. It should be noted that the method 1200 is just one implementation and that the operations of the method 1200 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication in a machine-to-machine (M2M) wireless Wide Area Network (WAN), comprising:
generating a physical layer frame for wireless M2M communication on a forward link in the M2M wireless WAN, the frame comprising no more than three channels including a first channel comprising a paging channel and a second channel comprising a traffic channel;
performing a time division multiplexing (TDM) operation on one or more pilot symbols and one or more data symbols to obtain one or more TDM pilot bursts;
scrambling the TDM pilot bursts and the data symbols using a first pseudo noise (PN) sequence, the first PN sequence being offset from a PN sequence used to scramble TDM pilot bursts and data symbols of a frame transmitted from a neighbor base station; and
inserting the one or more TDM pilot busts in one or more channels of the physical layer frame.

2. The method of claim 1, wherein the frame further includes a third channel comprising an acknowledgment (ACK) channel, the length of the first channel comprising the paging channel and the length of the third channel comprising the ACK channel is 5 milliseconds (ms), and the length of the second channel comprising the traffic channel is 10 ms.

3. The method of claim 1, further comprising:
transmitting system information and timing information using the first channel comprising the paging channel.

4. The method of claim 1, further comprising:
identifying a time slot of the physical layer frame that is assigned to an M2M device; and
transmitting data during the identified time slot to the M2M device.

5. The method of claim 1, further comprising:
receiving a plurality of messages from a plurality of M2M devices;
generating a plurality of acknowledgment (ACK) messages;
grouping the plurality of ACK messages into an ACK packet; and
transmitting the ACK packet comprising the plurality of ACK messages.

6. The method of claim 1, further comprising:
inserting the one or more TDM pilot bursts in each channel of the physical layer frame, each TDM pilot burst comprising a length of 56 chips, a chip being a pseudo noise (PN) code symbol; and
spacing consecutive TDM pilot bursts by 256 chips.

7. The method of claim 1, further comprising:
transmitting the physical layer frame on the forward link to one or more M2M devices, wherein the physical layer frame is transmitted at a data rate of 6 bits per second.

8. The method of claim 1, wherein the length of the physical layer frame is 20 milliseconds (ms).

9. A base station configured for wireless communication in a machine-to-machine (M2M) wireless Wide Area Network (WAN), comprising:
a processor;
memory in electronic communication with the processor; and
instructions stored in the memory, the instructions being executable by the processor to:
generate a physical layer frame for wireless M2M communication on a forward link in the M2M wireless WAN, the frame comprising no more than three channels including a first channel comprising a paging channel, and a second channel comprising a traffic channel;
perform a time division multiplexing (TDM) operation on one or more pilot symbols and one or more data symbols to obtain one or more TDM pilot bursts;
scramble the TDM pilot bursts and the data symbols using a first pseudo noise (PN) sequence, the first PN sequence being offset from a PN sequence used to scramble TDM pilot bursts and data symbols of a frame transmitted from a neighbor base station; and
insert the one or more TDM pilot busts in one or more channels of the physical layer frame.

10. The base station of claim 9, wherein the frame further includes a third channel comprising an acknowledgment (ACK) channel, the length of the first channel comprising the paging channel and the length of the third channel comprising the ACK channel is 5 milliseconds (ms), and the length of the second channel comprising the traffic channel is 10 ms.

11. The base station of claim 9, wherein the instructions are further executable by the processor to:
transmit system information and timing information using the first channel comprising the paging channel.

12. The base station of claim 9, wherein the instructions are further executable by the processor to:
identify a time slot of the physical layer frame that is assigned to an M2M device; and
transmit data during the identified time slot to the M2M device.

13. The base station of claim 9, wherein the instructions are further executable by the processor to:
receive a plurality of messages from a plurality of M2M devices;
generate a plurality of acknowledgment (ACK) messages;
group the plurality of ACK messages into an ACK packet; and
transmit the ACK packet comprising the plurality of ACK messages.

14. The base station of claim 9, wherein the instructions are further executable by the processor to:
insert the one or more TDM pilot bursts in each channel of the physical layer frame, each TDM pilot burst comprising a length of 56 chips, a chip being a pseudo noise (PN) code symbol; and
space consecutive TDM pilot bursts by 256 chips.

15. The base station of claim 9, wherein the instructions are further executable by the processor to:
transmit the physical layer frame on the forward link to one or more M2M devices, wherein the physical layer frame is transmitted at a data rate of 9.6 bits per second.

16. The base station of claim 9, wherein the length of the physical layer frame is 20 milliseconds (ms).

17. An apparatus configured for wireless communication in a machine-to-machine (M2M) wireless Wide Area Network (WAN), comprising:
means for generating a physical layer frame for wireless M2M communication on a forward link in the M2M wireless WAN, the frame comprising no more than three channels including a first channel comprising a paging channel, and a second channel comprising a traffic channel;
means for performing a time division multiplexing (TDM) operation on one or more pilot symbols and one or more data symbols to obtain one or more TDM pilot bursts;
means for scrambling the TDM pilot bursts and the data symbols using a first pseudo noise (PN) sequence, the first PN sequence being offset from a PN sequence used to scramble TDM pilot bursts and data symbols of a frame transmitted from a neighbor base station; and means for inserting the one or more TDM pilot busts in one or more channels of the physical layer frame.

18. The apparatus of claim 17, wherein the frame further includes a third channel comprising an acknowledgment (ACK) channel, the length of the first channel comprising the paging channel and the length of the third channel comprising the ACK channel is 5 milliseconds (ms), and the length of the second channel comprising the traffic channel is 10 ms.

19. The apparatus of claim 17, further comprising:
means for transmitting system information and timing information using the first channel comprising the paging channel.

20. The apparatus of claim 17, further comprising:
means for identifying a time slot of the physical layer frame that is assigned to an M2M device; and
means for transmitting data during the identified time slot to the M2M device.

21. The apparatus of claim 17, further comprising:
means for receiving a plurality of messages from a plurality of M2M devices;
means for generating a plurality of acknowledgment (ACK) messages;
means for grouping the plurality of ACK messages into an ACK packet; and
means for transmitting the ACK packet comprising the plurality of ACK messages.

22. The apparatus of claim 17, further comprising:
means for inserting the one or more TDM pilot bursts in each channel of the physical layer frame, each TDM pilot burst comprising a length of 56 chips, a chip being a pseudo noise (PN) code symbol; and
means for spacing consecutive TDM pilot bursts by 256 chips.

23. The apparatus of claim 17, further comprising:
means for transmitting the physical layer frame on the forward link to one or more M2M devices, wherein the physical layer frame is transmitted at a data rate of 9.6 bits per second.

24. The apparatus of claim 17, wherein the length of the physical layer frame is 20 milliseconds (ms).

25. A computer program product for managing wireless communication in a machine-to-machine (M2M) wireless Wide Area Network (WAN), the computer program product comprising a non-transitory computer-readable medium storing instructions executable by a processor to:
generate a physical layer frame for wireless M2M communication on a forward link in the M2M wireless WAN, the frame comprising no more than three channels including a first channel comprising a paging channel, and a second channel comprising a traffic channel;
perform a time division multiplexing (TDM) operation on one or more pilot symbols and one or more data symbols to obtain one or more TDM pilot bursts;
scramble the TDM pilot bursts and the data symbols using a first pseudo noise (PN) sequence, the first PN sequence being offset from a PN sequence used to scramble TDM pilot bursts and data symbols of a frame transmitted from a neighbor base station; and
insert the one or more TDM pilot busts in one or more channels of the physical layer frame.

26. The computer program product of claim 25, wherein the frame further includes a third channel comprising an acknowledgment (ACK) channel, the length of the first channel comprising the paging channel and the length of the third channel comprising the ACK channel is 5 milliseconds (ms), and the length of the second channel comprising the traffic channel is 10 ms.

27. The computer program product of claim 25, the computer-readable medium storing instructions further executable by the processor to:
transmit system information and timing information using the first channel comprising the paging channel.

28. The computer program product of claim 25, the computer-readable medium storing instructions further executable by the processor to:
identify a time slot of the physical layer frame that is assigned to an M2M device; and
transmit data during the identified time slot to the M2M device.

29. The computer program product of claim 25, the computer-readable medium storing instructions further executable by the processor to:
receive a plurality of messages from a plurality of M2M devices;
generate a plurality of acknowledgment (ACK) messages;
group the plurality of ACK messages into an ACK packet; and
transmit the ACK packet comprising the plurality of ACK messages.

30. The computer program product of claim 25, the computer-readable medium storing instructions further executable by the processor to:
insert the one or more TDM pilot bursts in each channel of the physical layer frame, each TDM pilot burst comprising a length of 56 chips, a chip being a pseudo noise (PN) code symbol; and
space consecutive TDM pilot bursts by 256 chips.

31. The computer program product of claim 25, the computer-readable medium storing instructions further executable by the processor to:
transmit the physical layer frame on the forward link to one or more M2M devices, wherein the physical layer frame is transmitted at a data rate of 9.6 bits per second.

32. The computer program product of claim 25, wherein the length of the physical layer frame is 20 milliseconds (ms).

* * * * *